(12) United States Patent
Andrews et al.

(10) Patent No.: US 9,725,152 B2
(45) Date of Patent: *Aug. 8, 2017

(54) SINGLE PIECE FUSELAGE BARREL

(71) Applicant: The Boeing Company, Chicago, IL (US)

(72) Inventors: Francis E. Andrews, Everett, WA (US); Max U. Kismarton, Renton, WA (US); William J. Koch, IV, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/145,987

(22) Filed: May 4, 2016

(65) Prior Publication Data

US 2016/0244141 A1 Aug. 25, 2016

Related U.S. Application Data

(63) Continuation of application No. 11/163,798, filed on Oct. 31, 2005, now Pat. No. 9,359,061.

(51) Int. Cl.
| | | |
|---|---|---|
| *B64C 1/06* | (2006.01) | |
| *B64C 1/12* | (2006.01) | |
| *B29C 70/44* | (2006.01) | |
| *B29C 70/20* | (2006.01) | |
| *B29C 70/30* | (2006.01) | |
| *B64F 5/10* | (2017.01) | |
| *B29K 105/24* | (2006.01) | |
| *B29L 31/30* | (2006.01) | |
| *B64C 1/00* | (2006.01) | |
| *B29K 105/10* | (2006.01) | |
| *B29K 105/00* | (2006.01) | |

(Continued)

(52) U.S. Cl.
CPC .............. *B64C 1/06* (2013.01); *B29C 70/202* (2013.01); *B29C 70/30* (2013.01); *B29C 70/44* (2013.01); *B64C 1/068* (2013.01); *B64C 1/12* (2013.01); *B64F 5/10* (2017.01); *B29K 2105/108* (2013.01); *B29K 2105/246* (2013.01); *B29K 2105/253* (2013.01); *B29K 2307/04* (2013.01); *B29K 2309/08* (2013.01); *B29K 2995/0089* (2013.01); *B29L 2031/3082* (2013.01); *B64C 2001/0072* (2013.01); *Y02T 50/433* (2013.01)

(58) Field of Classification Search
CPC . B64C 2001/0072; B64C 1/065; B64C 1/061; B64C 1/062; B64C 1/068; B64C 1/12
See application file for complete search history.

(56) References Cited

U.S. PATENT DOCUMENTS

| | | | | |
|---|---|---|---|---|
| 6,510,961 B1* | 1/2003 | Head | .......................... | D04C 1/06 |
| | | | | 220/590 |
| 2002/0069962 A1* | 6/2002 | Maxwell | ............... | B29C 70/086 |
| | | | | 156/286 |

* cited by examiner

*Primary Examiner* — Brian M O'Hara
(74) *Attorney, Agent, or Firm* — Miller, Matthias & Hull LLP

(57) ABSTRACT

In accordance with the present invention an aircraft stringerless fuselage structure is provided comprising an impact compliant outer skin having a plurality of resin impregnated skin fibers forming an outer skin surface, an inner stringerless skin surface, and a skin thickness. A plurality of stiffeners is included, each comprising a plurality of resin impregnated stiffener fibers integrated into the inner stringerless skin structure. The plurality of resin impregnated skin fibers are not aligned with the plurality of resin impregnated stiffener fibers.

17 Claims, 3 Drawing Sheets

(51) Int. Cl.
*B29K 307/04* (2006.01)
*B29K 309/08* (2006.01)

SINGLE PIECE FUSELAGE BARREL

CROSS-REFERENCE TO RELATED APPLICATION

This application is a straight continuation of, and claims priority under 35 USC §119 (e) to, previously filed application, U.S. Ser. No. 11/163,798, filed Oct. 31, 2005.

TECHNICAL FIELD

The present invention relates generally to an apparatus and method for reducing the cost and complexity of the fuselage barrel section of an aircraft and more particularly to an apparatus and method for integrating a cost effective and compliant structure that absorbs energy during bird strike impact.

BACKGROUND OF THE INVENTION

Aircraft structures often provide complex and costly challenges to both design and manufacturing. The underlying structures must not only meet strength requirements, but must also survive constant weight reduction requirements and manufacturing cost and time restraints. As such, a reanalysis and creative investigation into existing structures bears the possible reward of considerable benefits during implementation.

Such is the case with the fuselage section of the aircraft. Specifically the forward section commonly referred to as section 41. This fuselage section includes complex geometry and structure by way of the inclusion of both nose section as well as cockpit windows and similar features. Additionally, this portion of the aircraft comes under close scrutiny for its ability to have bird strike resistance. As such, section 41 barrel sections are often over-designed, a factor that may lead to excess weight as well as excess cost.

Present fuselage sections are commonly focused on designs that are stout and heavy. Often the outer skin and other structural supports are formed from aluminum which when overloaded may result in costly damage or repair. Bird strike incidents, even on designs that are not overloaded, may leave large dents in the aluminum structure that eventually require costly repairs. When overloaded, however, portions of the aluminum structure may rupture requiring extremely expensive repair or replacement. The aluminum skin also requires complex manufacturing and assembly as the skin is commonly backed by very heavy and complex beam structures. Structures such as stringers are required for support and add both considerable cost in addition to weight to the aircraft. The complex curvatures of the skins, especially in the nose region, often require manufacturing using expensive computer controlled machines. The quantity and complexity of manufacturing and assembling these aluminum structures often make section 41 the most expensive barrel section in the entire aircraft body.

What is needed is a design and method for manufacturing this complex section of the fuselage that allows for simplification of manufacturing while simultaneously allowing for a compliant approach to bird strike resistance. Additionally, it would be highly desirable to have such a design and method that provides opportunities to reduce section weight in addition to manufacturing costs.

SUMMARY OF THE INVENTION

In accordance with the present invention an aircraft stringerless fuselage structure is provided comprising an impact compliant outer skin having a plurality of resin impregnated skin fibers forming an outer skin surface, an inner stringerless skin surface, and a skin thickness. A plurality of stiffeners is included, each comprising a plurality of resin impregnated stiffener fibers integrated into the inner stringerless skin structure. The plurality of resin-impregnated skin fibers are not aligned with the plurality of resin impregnated stiffener fibers.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
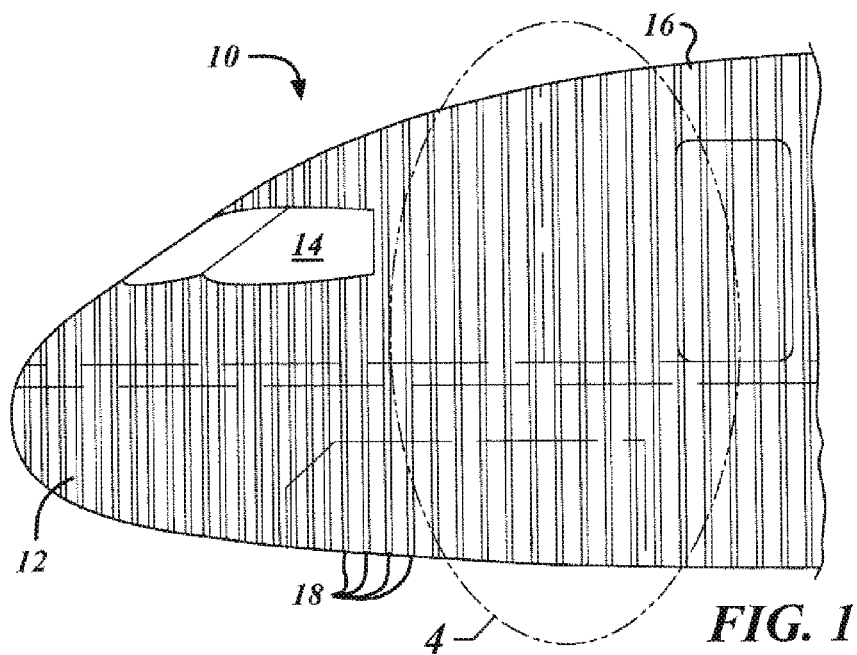
FIG. 1 is an illustration of an aircraft stringerless fuselage section in accordance with the present invention.
Figure 2:
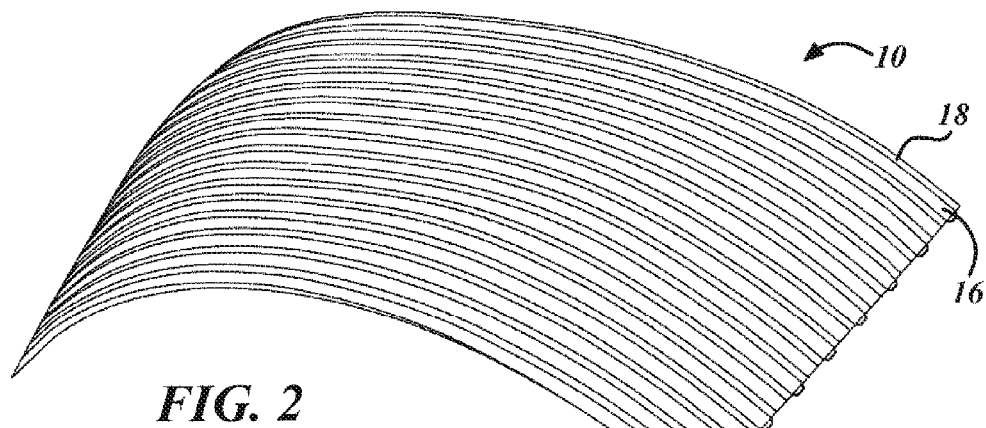
FIG. 2 is a detailed illustration of the impact compliant outer skin utilized in the fuselage section illustrated in FIG. 1.

Referring now to FIG. 1, which is an illustration of an aircraft stringerless fuselage section 10 in accordance with the present invention. The section 10 is illustrated as the commonly known section forty-one section although it is contemplated that the present invention is applicable to a variety of aircraft build zones. The section 10 presented includes the nose portion 12 in addition to the cockpit windows 14 wherein the geometry of the barrel section 10 is varied considerably in addition to requiring additional strength requirements. One of these requirements is the ability to withstand bird impact loads during operation. Existing designs contemplate the use of aluminum skins and complex and costly support structures underneath such as the use of complex curved stringers or other beams. In addition, existing approaches often result in costly repairs during bird strike due to their rigid approach to bird strike protection.

The present invention accomplishes both weight savings and bird strike protection through a unique combination of the use of a uniquely bird strike compliant outer skin 16 (impact resistant) that allows a redirection of bird path without damage in combination with the integration therein of a plurality of stiffener members 18, preferably circumferentially orientated, that provide sufficient structural support of the skin 16 without debonding during bird strike and without diminishing the skin compliance. It should be understood that in addition to pure circumferential orientation, perpendicular to the axis, variations of angled circumferential orientation, including intersecting stiffeners angled relative to the axis, are contemplated. The present invention contemplates the use of an impact resistant outer skin 16 that is tailored to be compliant and absorb or redirect the impact of bird strikes. The present invention accomplishes this through the use of a skin 16 formed from a plurality of resin impregnated skin fibers 20 forming a skin 16 having an outer skin surface 22, an inner stringerless skin surface 24, and a skin thickness 26. It is contemplated that the plurality of impregnated skin fibers 20 is intended to include both pre-preg tape or dry fibers with infused resin.

A key characteristic, however, is that the skin thickness 26 is contemplated to be variable to accommodate the strength requirements of differing bird impact zones or structural zones (such as the cockpit windows 14) of the barrel section 10. It is contemplated that skin thickness 26 be variable between the range of 0.08 inches and 0.25 inches to provide the proper strength to weight ratio. It is contemplated that the skin 16 be formed using high strain fibers such as Spectra® fibers, Vectran™ fibers, low modulus graphite (GR), or even fiberglass. These fibers are chosen to provide a compliant structure that, instead of crushing or rupturing during impact, deforms and deflects the bird trajectory. Additional contemplated features include the use of hybrid laminates wherein two or more fiber types are utilized in order to achieve the desired strength/compliance characteristics. One specific embodiment contemplates that the skin 16 be formed using an intermediate modulus (22-25 MSI) toughened carbon pre-preg tape. It is further contemplated that the use of 0/45/90 degree laminate mixture at 20/80/0 percentage ratios provides the preferably structural characteristics for the skin 16. The present invention contemplates the use of non-traditional fiber angles in laminates to achieve the desired strength/conformity properties.

Figure 3:
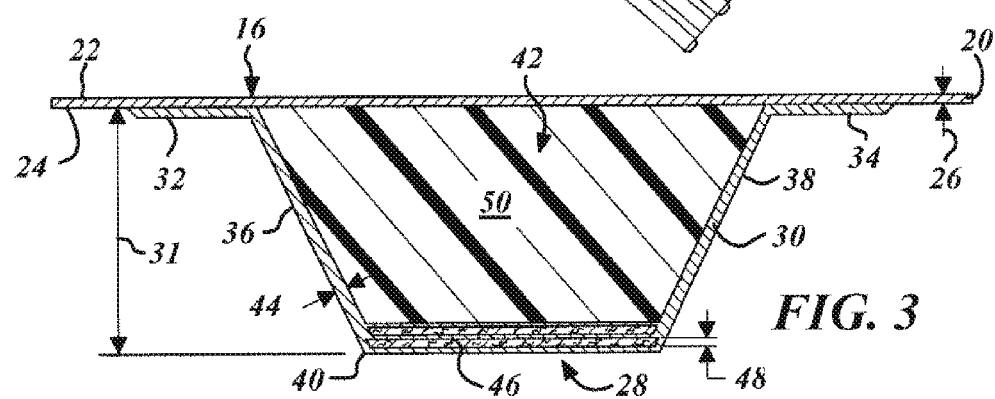
FIG. 3 is a detailed cross-sectional illustration of a portion of the aircraft fuselage section illustrated in FIGS. 1 and 2.
Figure 4:
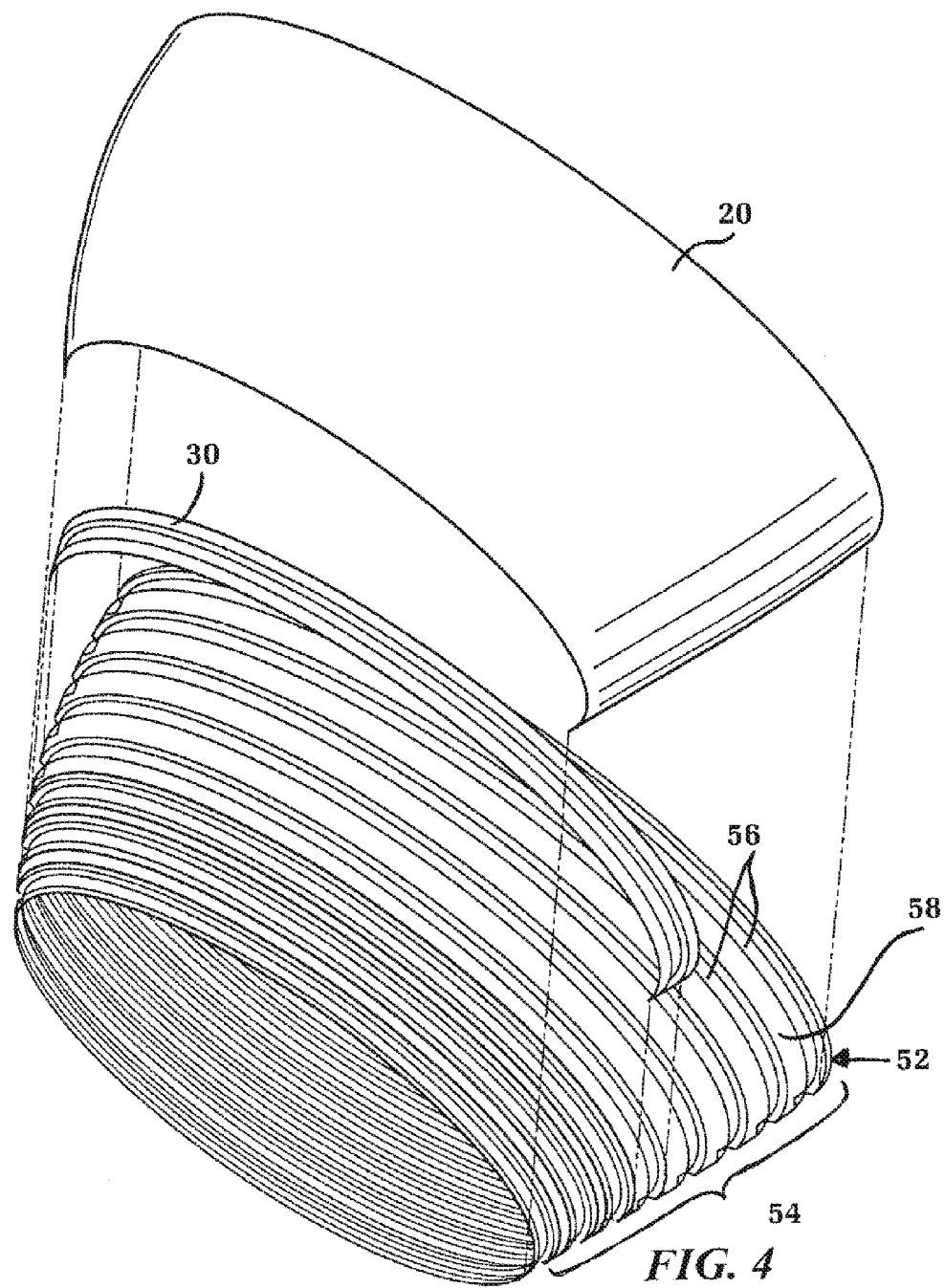
FIG. 4 is an illustration of a lay-up tool for use in the manufacturing of the aircraft fuselage section illustrated in FIGS. 1 and 2.
Figure 5:
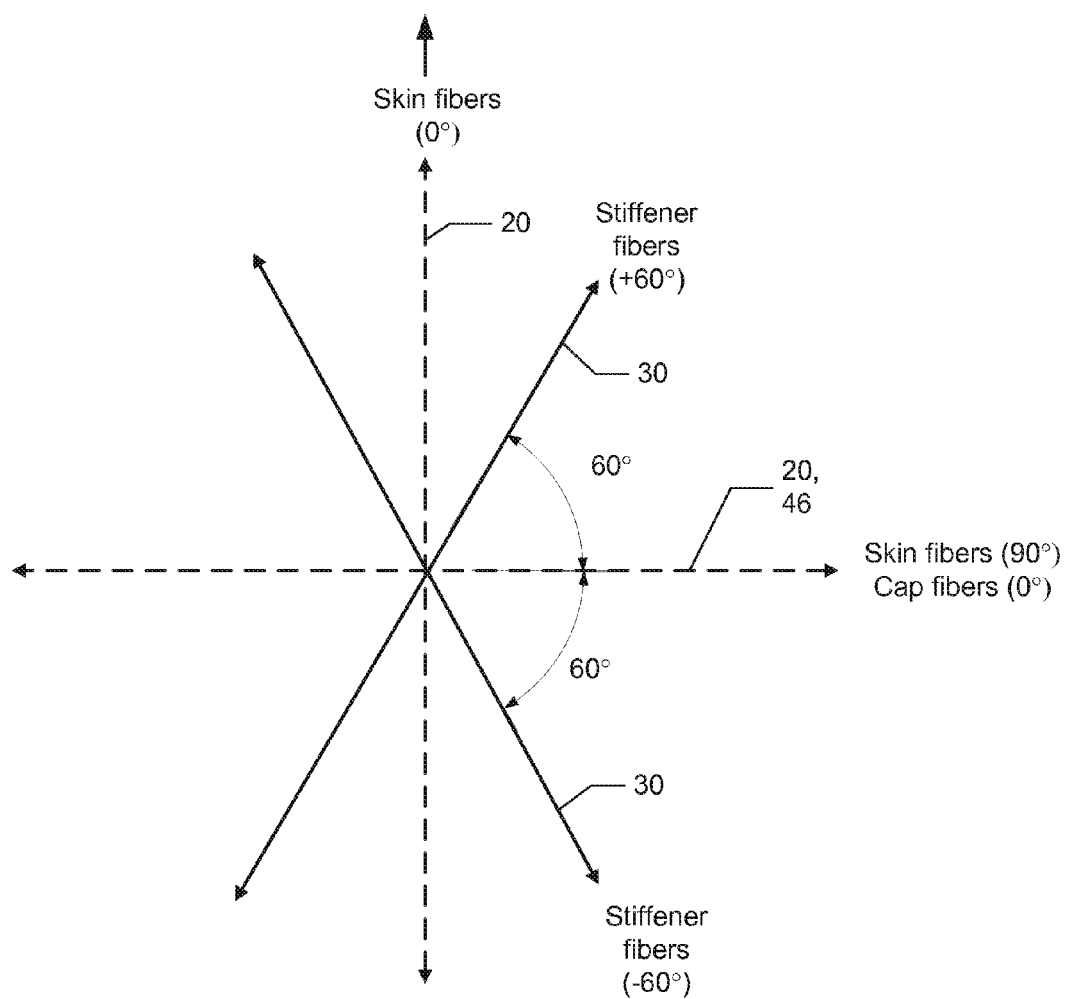
FIG. 5 is an illustration of orientations of skin fibers, stiffener fibers and cap fibers.

By designing an impact conforming (resistant) outer skin 16 with unique construction and properties, the present invention paves the way for elimination of the need for stringers in the barrel section 10. This saves weight in addition to manufacturing costs. The present invention, instead, relies on the use of low profile and low modulus elements such as the hat frame assembly 28 illustrated in FIG. 3 for use as the circumferentially orientated stiffener members 18. Although hat frames are specifically described and illustrated, it is contemplated that the hat frame assemblies 28 may include, but are not limited to, hat frames, c-channels, Z-beams, J-beams, T-Beams and I-beams, and blade stiffened beams. The hat frames are preferably formed to comply with toughened outer skin 16 and are formed using a plurality of resin impregnated stiffener fibers 30 (preferably low-modulus fibers). These low modulus stiffener fibers 30 are preferably fully integrated into the skin fibers 20 of the inner stringerless skin surface 24 and co-cured to form a single element. The low modulus stiffener fibers 30 are preferably high strain fibers such as fiberglass, Spectra® fibers, Vectran™, or low modulus GR. Similar to the skin 16 it is contemplated that hybrid laminates and non-traditional lay-up angles may be utilized to achieve the desired conformity during impact while retaining sufficient structural support. In one embodiment, the low modulus frame stiffener fibers 30 are preferably laid up as + or −60 degree laminates (see FIG. 5). Although a variety of lay-up arrangements may be utilized, it is preferably that the stiffener fibers 30 are not aligned (0 or 90 degrees) with the skin fibers 20 (see FIG. 5). The hat frame assembly 28 preferably is designed with both a low profile and a low modulus to resist debonding with the outer skin 16 during bird impact. It is contemplated that low profile is intended to comprise a profile height 31 of less than 3 inches and preferably less than 2 inches. It is further contemplated that low modulus is intended to comprise approximately 3-25 MSI. One embodiment contemplates the use of carbon fiber impregnated with epoxy for use in forming the hat frame assembly 28.

In one embodiment of the hat frame assembly 28, the hat frame includes a first frame foot 32 and a second frame foot 34. A first angled sidewall 36 and second angled sidewall 38 proceed out of their respective feet and extend toward a hat top portion 40 joining the sidewalls 36, 38. This hat frame thereby defines a hat frame interior 42 which is located between the hat top 40 and the outer skin 16 when the feet 32, 34 are bonded to the inner stringerless skin surface 34. Although a variety of hat frames are contemplated, one embodiment contemplates a frame wall thickness 44 of approximately 0.05 inches. This, in combination with the low profile helps provide the low modulus characteristics suitable for impact protection and stringerless support.

The hat frame assembly 28 can further include one or more cap elements 46 integrated into the hat top portion 40 of the hat frame assembly 28. As is illustrated, one embodiment contemplates the use of a pair of vertically stacked cap elements. The cap elements 46 are preferably low density caps such as fiberglass caps or preferably S-2 glass plies. In one embodiment it is contemplated that the cap elements have a width 48 between the range of 0.08 inches and 0.15 inches. It is desirable that the cap elements 46 be comprised of 0 degree laminates interleaved with the resin impregnated stiffener fibers 30 (see FIG. 5). The hat frame assembly 28 may also include a pcf foam element 50 (3-7 pcf) that also may be tailored to individual impact zones or skin thicknesses 26. The use of the foam element 50 allows for a further tailoring of impact resistance without negatively impacting either weight or the low modulus nature of the hat frame assembly 28 and skin 16 interaction that provides compliance and prevents damage or debonding during impact while continuing to provide enough structural rigidity to allow for the elimination of stringers.

The present invention, in addition to providing a vastly improved structure and approach to bird strike damage reduction, also provides a vastly improved methodology of manufacturing and assembling the aircraft fuselage section. Prior approaches required the use of aluminum skin with complex multi-curved shapes and corresponding beam stringers with matching curves. The present invention, however, yields a far more cost effective and efficient method of manufacturing and assembly. The present invention contemplates the use of a fuselage lay-up tool 52 incorporating a plurality of multi-curved shapes 54 along its length. The lay-up tool 52 includes a plurality of stiffener grooves 56 on its upper tool surface 58. The stiffener grooves 56 are configured to allow the low modulus stiffener fibers 30 to be laid up directly onto the grooves 56 and thereby form a hat frame assembly 28 or other stiffener member 18. The stiffener grooves 56 further allow the stiffener members 18 to be located precisely in relation to both each other and the overall fuselage section 10. The skin fibers 20 may then be laid-up over the low modulus stiffener fibers 30 to complete the integrated skin/frame assembly and then the whole assembly may be cured as a single entity. This contemplates co-curing where the stiffener fibers 30 are laid in green, the skin fibers 20 are applied on top, and the whole assembly is simultaneously cured. This further contemplates co-bonding wherein the stiffener fibers 30 are cured prior to the application of the skin fibers 20. This allows the fuselage to be created as a single entity with double curved or multi-curved characteristics. Thereby complex skin shapes are accommodated in addition to the bonding of complex frames concurrently. This has the potential for generating both savings as well as performance improvements to fuselage design and production.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An aircraft fuselage nose section having a longitudinal axis, and comprising:
    a unitary circumferentially extending composite skin;
    a plurality of composite fiber stiffeners, each stiffener including at least one foot, at least one sidewall, and a cap;
    the at least one foot bonded to an interior circumference of the composite skin;
    each composite fiber stiffener extending in a circumferential direction;
    said plurality of composite fiber stiffeners spaced orthogonally with respect to the longitudinal axis to define a spaced parallel array, each stiffener defining a continuous circumferential structural component of the nose section, the cap spaced apart from the composite skin;
    wherein the composite skin includes plies of carbon fibers that extend at an angle with respect to the circumferential direction;
    wherein the cap further includes plies of glass fibers that extend orthogonally with respect to the longitudinal axis;
    wherein the at least one sidewall includes resin impregnated glass fibers;
    wherein the plies of glass fibers of the cap are interleaved with the resin impregnated glass fibers of the at least one sidewall; and
    wherein the interior circumference of the composite skin is stringerless.

2. The aircraft fuselage nose section of claim 1, wherein the glass fibers and the carbon fibers are configured to protect the nose section against strike impact loads.

3. The aircraft fuselage nose section of claim 1, wherein the carbon fibers are oriented at angles of +60 degrees and −60 degrees with respect to the circumferential direction.

4. The aircraft fuselage nose section of claim 1, wherein the glass fibers are S-2 fibers or fiberglass.

5. The aircraft fuselage nose section of claim 1, wherein each stiffener is a hat stiffener.

6. The aircraft fuselage nose section of claim 5, wherein the hat stiffener comprises a pair of sidewalls, a hat top connecting the pair of sidewalls, and wherein the cap is contained within the hat top.

7. The aircraft fuselage nose section of claim 6, wherein the hat top includes pcf foam.

8. The aircraft fuselage nose section of claim 6, wherein the sidewalls are angled.

9. The aircraft fuselage nose section of claim 1, wherein each of the composite stiffeners comprise low modulus, high strain fibers.

10. The aircraft fuselage nose section of claim 1, wherein the composite skin is impact compliant, and the composite fiber stiffeners are resin impregnated and co-cured with the composite skin.

11. The aircraft fuselage nose section of claim 1, wherein the cap comprises a pair of radially stacked cap elements.

12. The aircraft fuselage nose section of claim 1, wherein the composite skin has a thickness between 0.08 inch and 0.25 inch.

13. The aircraft fuselage nose section of claim 1, wherein the stiffeners comprise a thickness of 0.05 inch.

14. The aircraft fuselage nose section of claim 1, wherein each cap comprises a width of 0.08 inch to 1.5 inches.

15. The aircraft fuselage nose section of claim 1, wherein each cap defines a circle about the interior of the nose section.

16. An aircraft fuselage nose section having a longitudinal axis, and comprising:
    a unitary circumferentially extending composite skin;
    a plurality of composite fiber stiffeners, each stiffener including at least one foot, at least one sidewall, and a cap;
    the at least one foot bonded to an interior circumference of the composite skin;
    each stiffener extending in a circumferential direction;
    said plurality of composite fiber stiffeners spaced orthogonally with respect to the longitudinal axis to define a spaced parallel array, each stiffener defining a continuous circumferential structural component of the nose section, the cap spaced apart from the composite skin;
    wherein the composite skin includes plies of carbon fibers that extend at an angle with respect to the circumferential direction;
    wherein the cap further includes plies of glass fibers that extend orthogonally with respect to the longitudinal axis;
    wherein the composite skin comprises a hybrid laminate;
    wherein the at least one sidewall includes resin impregnated glass fibers;
    wherein the plies of glass fibers of the cap are interleaved with the resin impregnated glass fibers of the at least one sidewall; and
    wherein the interior circumference of the composite skin is stringerless.

17. A method of forming a stringerless aircraft fuselage nose section having a longitudinal axis; the method comprising the steps of:
    laying-up a unitary circumferentially extending composite skin;
    laying-up a plurality of composite fiber stiffeners, each stiffener including at least one foot, at least one sidewall, and a cap, with the at least one foot bonded to an interior circumference of the composite skin;
    forming each stiffener to extend in a circumferential direction;
    forming the plurality of composite fiber stiffeners orthogonally with respect to the longitudinal axis to define a spaced parallel array;
    forming each stiffener as a continuous circumferential structural component of the nose section,
    forming the cap to include plies of carbon fibers that extend at an angle with respect to the circumferential direction, and to include plies of glass fibers that extend orthogonally with respect to the longitudinal axis, and assuring that the cap is spaced apart from the skin via the at least one sidewall; and
    co-curing the composite skin and the stiffeners to finish forming the stringerless aircraft fuselage nose section.

* * * * *